United States Patent
Wang et al.

(10) Patent No.: US 11,133,875 B2
(45) Date of Patent: Sep. 28, 2021

(54) OVER-THE-AIR RECIPROCITY CALIBRATION FOR DISTRIBUTED-MULTIPLE INPUT—MULTIPLE OUTPUT SYSTEMS

(71) Applicant: Telefonaktiebolaget LM Ericsson (publ), Stockholm (SE)

(72) Inventors: Zhanxian Wang, Täby (SE); Christian Braun, Vallentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/757,152

(22) PCT Filed: Oct. 20, 2017

(86) PCT No.: PCT/SE2017/051033
§ 371 (c)(1),
(2) Date: Apr. 17, 2020

(87) PCT Pub. No.: WO2019/078766
PCT Pub. Date: Apr. 25, 2019

(65) Prior Publication Data
US 2020/0244376 A1    Jul. 30, 2020

(51) Int. Cl.
*H04B 17/00* (2015.01)
*H04B 7/02* (2018.01)
(Continued)

(52) U.S. Cl.
CPC ............ *H04B 17/12* (2015.01); *H04B 7/024* (2013.01); *H04B 17/14* (2015.01); *H04B 17/18* (2015.01); *H04W 88/08* (2013.01)

(58) Field of Classification Search
CPC ........ H04B 17/12; H04B 17/14; H04B 17/18; H04B 7/024; H04B 17/17; H04W 88/08
(Continued)

(56) References Cited

U.S. PATENT DOCUMENTS

2012/0099469 A1* 4/2012 Luo ............... H04L 25/0242
                                                  370/252
2018/0048361 A1* 2/2018 Kundargi ........... H04L 25/0204
(Continued)

FOREIGN PATENT DOCUMENTS

WO    2014039098 A1    3/2014
WO    2016176626 A1    11/2016

OTHER PUBLICATIONS

International Search Report and Written Opinion dated Sep. 12, 2018 for International Application No. PCT/SE2017/051033 filed on Oct. 20, 2017, consisting of 12-pages.
(Continued)

*Primary Examiner* — Don N Vo
(74) *Attorney, Agent, or Firm* — Christopher & Weisberg, P.A.

(57) ABSTRACT

The present disclosure relates to over-the-air, OTA, reciprocity calibration for a distributed multiple input-multiple output, D-MIMO, system. By having antennas of the system divided in two separate groups, based on pairwise path loss, and by performing two measurements only, one of which is transmitting by the first group and simultaneously receiving by the second group, and the second by transmitting by the second group and simultaneously receiving by the first group, relations between receiver and transmitter impairments used in the measurements are determined, assuming reciprocity. By relating receive to transmitter impairments for each antenna relative to one or more anchor antennas, calibration values are calculated. By adjusting a quota of the receiver to the transmitter impairment for each antenna such that the relations are fulfilled, reciprocity calibration is achieved, based on two measurements only.

20 Claims, 4 Drawing Sheets

(51) Int. Cl.
  *H04B 17/12*  (2015.01)
  *H04B 17/14*  (2015.01)
  *H04B 17/18*  (2015.01)
  *H04B 7/024*  (2017.01)
  *H04W 88/08*  (2009.01)

(58) Field of Classification Search
  USPC ............... 375/224, 227, 228, 267; 455/67.11
  See application file for complete search history.

(56) References Cited

U.S. PATENT DOCUMENTS

2018/0123657 A1\* 5/2018 Kundargi ............ H04W 72/042
2020/0328829 A1\* 10/2020 Papadopoulos ........ H04B 17/12

OTHER PUBLICATIONS

3GPP TSG RAN WG1 RAN1 NR AdHoc R1-1700799; Title: Network OTA reciprocity calibration and phase synchronization; Agenda Item: 5.1.2.1; Source: Qualcomm Incorporated; Document for: Discussion/Decision; Location and Date: Spokane, USA, Jan. 16-20, 2017, consisting of 6-pages.

Rogalin et al. "Scalable Synchronization and Reciprocity Calibration for Distributed Multiuser MIMO" IEEE Transactions on Wireless Communications, vol. 13, No. 4, Apr. 2014, consisting of 17-pages.

Rogalin, et al. "Hardware-Impairment Compensation for Enabling Distributed Large-Scale MIMO" IEEE Information Theory and Applications Workshop, 2013, consisting of 10-pages.

Vieira, J., Rusek, F., & Tufvesson, F. (2014). Reciprocity calibration methods for Massive MIMO based on antenna coupling. Paper presented at IEEE Globecom 2014, Austin, Texas, United States, consisting 6-pages.

\* cited by examiner

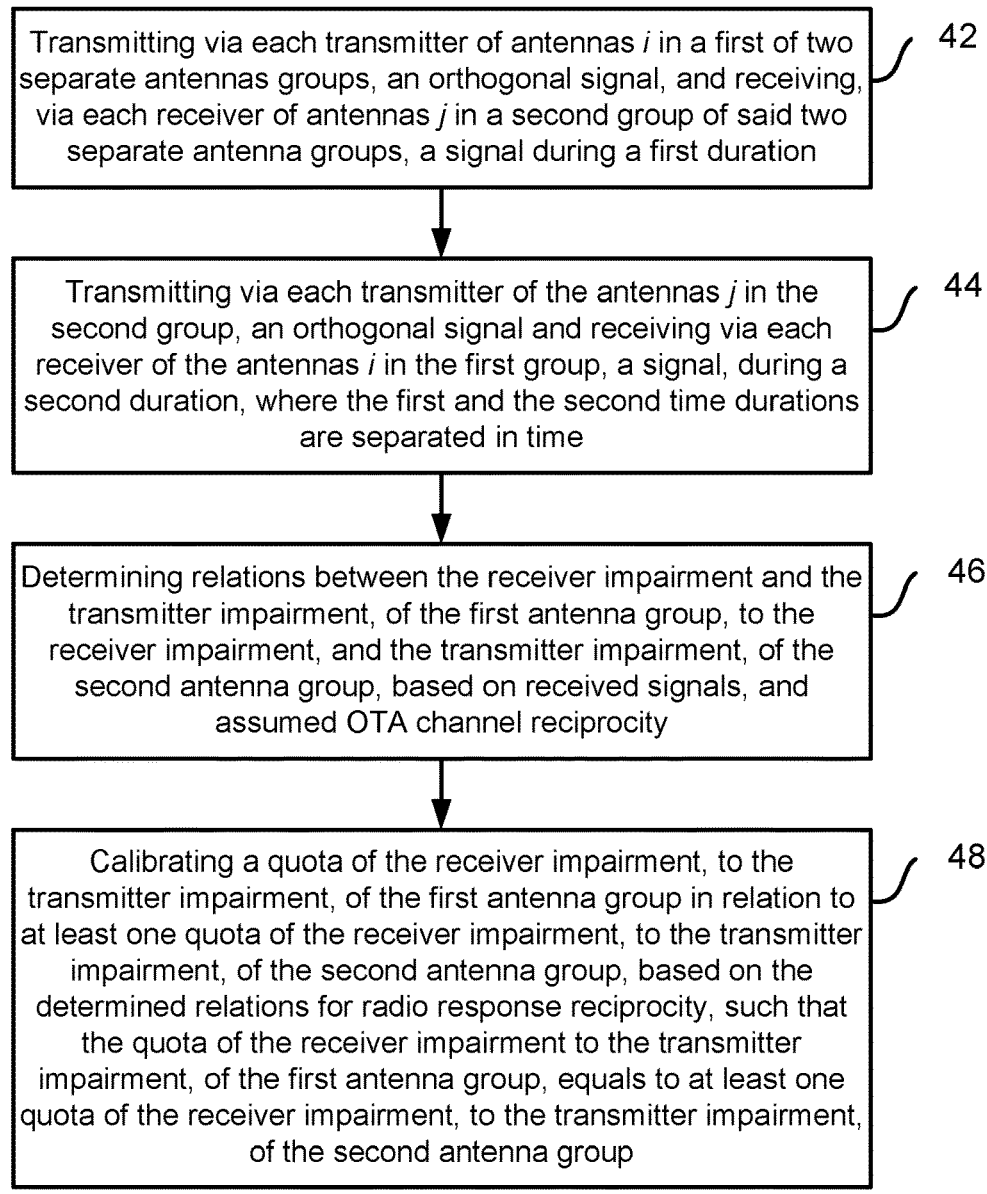
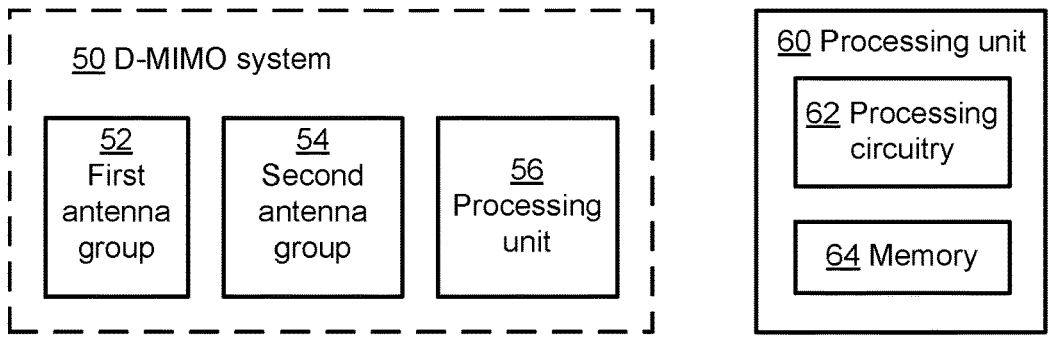
Figure 5
Figure 6

OVER-THE-AIR RECIPROCITY CALIBRATION FOR DISTRIBUTED-MULTIPLE INPUT—MULTIPLE OUTPUT SYSTEMS

CROSS-REFERENCE TO RELATED APPLICATIONS

This application is a Submission Under 35 U.S.C. § 371 for U.S. National Stage Patent Application of International Application Number: PCT/SE2017/051033, filed Oct. 20, 2017 entitled "OVER-THE-AIR-RECIPROCITY CALIBRATION FOR DISTRIBUTED-MULTIPLE INPUT—MULTIPLE OUTPUT SYSTEMS," the entirety of which is incorporated herein by reference.

TECHNICAL FIELD

This disclosure relates to providing over-the-air (OTA) reciprocity in a distributed multiple input-multiple output (MIMO) system. More particularly, it relates to providing efficient calibration for OTA reciprocity for D-MIMO systems.

BACKGROUND

Antenna systems having D-MIMO are capable of providing large gains in scenarios such as stadium, hot-spot and street-level scenario. In a D-MIMO system, several physically separated radio units are used to form a many-antenna MIMO system. The radio units used are typically Micro-type radio units.

By using coherent joint transmission for all antennas in a D-MIMO system, high OTA gains are achieved. Coherent joint transmission means that downlink (DL) transmission is beamformed among all transmitting antenna branches in a way such that a beamforming gain is achieved at the position of the user equipment (UE).

For time division duplex (TDD) systems, coherency can be achieved by ensuring certain reciprocity between antenna branches in the antenna system. Reciprocity coherency is enough for TDD systems for the reason that the OTA channel is reciprocal and the uplink (UL) signal from each UE can be utilized to create beamforming weights to be used for DL transmission.

In the case many radio units are distributed into different physical locations, and each radio unit comprises multiple transmitters and receivers, high accuracy calibration of the antennas becomes cumbersome. In this case, high accuracy radio frequency (RF) calibration has to be assisted by additional calibration network hardware, in a so called Intra-remote radio unit (RRU) calibration. Distributed antennas having radio units located in different physical locations also need to be calibrated in the so called Inter-RRU calibration.

Methods to provide reciprocity between antenna branches typically include measuring a signal between defined antenna pairs over the air and calibrating each antenna pair to each other. For each such antenna pair one measurement is typically performed. In order to calibrate all antenna branches in the D-MIMO system, a number of measurements will hence be required.

When applying calibration-specific OTA measurements ongoing traffic is interrupted, so that traffic signals do not interfere with calibration signals. The larger the D-MIMO system, the higher number of measurements is needed, thus increasingly impacting ongoing traffic.

If there is no single antenna having a sufficiently low path loss to all other antennas in the antenna system, enabling communication between said single antenna and said all other antennas, antenna calibration is also cumbersome. Several measurements involving different antennas (using different anchor points) are typically performed, requiring a number of OTA measurements per calibration event.

Antennas within one and the same radio unit typically have a high coupling to each other. In for instance a 2T2R, or a 4T4R, radio unit, a too high a coupling will unable having one antenna in transmitting mode and the other antenna in receiving mode, for the reason that the received signal easily becomes too high and causes pronounced saturation at the receiver.

There is thus a demand for an improved technique circumventing or at least diminishing issues associated with OTA coherency calibration of antennas in a D-MIMO system.

SUMMARY

It is an object of exemplary embodiments herein to address at least some of the issues outlined above and to provide reciprocity calibration of a distributed multiple input-multiple output system, according to the appended independent claims, and by the exemplary embodiments according to the dependent claims.

This object and others are achieved by a method of over-the-air reciprocity calibration for a distributed-multiple input multiple output system, according to embodiments of the present disclosure. The distributed-multiple input multiple output system comprises two separate antenna groups, where each antenna pair of antennas i in at least a first group of said two separate antenna groups, has a path loss that is either above a first path loss threshold, or below a second path loss threshold, the first path loss threshold being substantially higher than the second path loss threshold, where each antenna i has a receive impairment $r_i$ and a transmitter impairment $t_i$. The method comprises transmitting by each transmitter of the antennas i in the first group, a mutually orthogonal signal $C_i$, and receiving by each receiver of antennas j in a second group of said two separate antenna groups a signal $Y_j$ during a first duration. The method also comprises transmitting by each transmitter of the antennas j in the second group, a mutually orthogonal signal $C_j$ and receiving by each receiver of the antennas i in the first group a signal $Y_i$; during a second duration, where the first and the second time durations are separated in time. The method also comprises determining relations between the receiver impairment $r_i$, the transmitter impairment $t_i$, of the first group of antennas, to the receiver impairment $r_j$, and the transmitter impairment $t_j$, of the second group of antennas, based on received signals $Y_i$, $Y_j$, mutually orthogonal signals $C_i$, $C_j$, and assumed over-the-air channel reciprocity. In addition, the method comprises calibrating a quota of the receiver impairment $r_i$, to the transmitter impairment $t_i$, in relation to at least one quota of the receiver impairment $r_j$, to the transmitter $t_j$, based on the determined relations for radio response reciprocity, such that the quota of the receiver impairment $r_i$, to the transmitter impairment $t_i$, equals to at least one quota of the receiver impairment $r_j$, providing reciprocity calibration of antennas in the first and second antenna groups in the distributed-multiple input multiple output system.

This object and others are achieved by a distributed multiple input-multiple output system capable of over-the-air reciprocity calibration. The system comprises two separate antenna groups, wherein each antenna pair of antennas i of a first group of said two antennas groups, is adapted to have a path loss that is either above a first path loss threshold, or below a second path loss threshold. The first path loss threshold is substantially higher than the second path loss threshold. Each antenna i has a receiver and a transmitter, having a receiver impairment $r_i$ and a transmitter impairment $t_i$, respectively. Each transmitter of the antennas i in the first antenna group is adapted to transmit, a mutually orthogonal signal $C_i$ during a first duration. Each receiver of antennas j in a second group of said two antenna groups is adapted to receive a signal $Y_j$ during the first duration. Each transmitter of the antennas j in the second antenna group is adapted to transmit a mutually orthogonal signal $C_j$ during a second duration. Each receiver of the antennas i in the first antenna group is adapted to receive a signal $Y_i$ during the second duration, where the first and second durations are separated in time. The system also comprises a processing unit that is adapted to be connected to antennas i of the first antenna group and to antennas j of the second antenna group. The processing unit comprises a processing circuitry and a memory. Said memory contains instructions executable by said processing circuitry whereby said processing unit is operative to initiate each transmitter of the antennas i in the first antenna group, to transmit a mutually orthogonal signal $C_i$ during a first duration. The processing unit is also operative to initiate each receiver of the antennas j in the second antenna group, to receive a signal $Y_j$ during the first duration. The processing unit is also operative to initiate each transmitter of the antennas j in the second antenna group, to transmit a mutually orthogonal signal $C_j$ during a second duration, where the first and second durations are separated in time. The processing unit is further operative to initiate each receiver of the antennas i in the first antenna group, to receive a signal $Y_i$ during the second duration. The processing unit is also operative to determine relations between the receiver impairment $r_i$, the transmitter impairment $t_i$, of the first antenna group, to the receiver impairment $r_j$, and the transmitter impairment $t_j$, of the second antenna group, based on received signals $Y_i$, $Y_j$, mutually orthogonal signals $C_i$, $C_j$, and assumed OTA channel reciprocity. In addition, the processing unit is operative to calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, such that the quota of the receiver impairment $r_i$, to the transmitter impairment $t_i$, equals at least one quota of the receiver impairment $r_j$, to the transmitter impairment $t_j$, thereby providing reciprocity calibration of antennas in the first and second antenna groups in the distributed multiple input-multiple output system.

This object and others are achieved by processing unit capable of over-the-air reciprocity calibration in a distributed multiple input-multiple output system. Said system comprises two separate antenna groups, wherein each antenna pair of antennas i of a first group of said two antennas groups, is adapted to have a path loss that is either above a first path loss threshold, or below a second path loss threshold, the first path loss threshold being substantially higher than the second path loss threshold, each antenna having a receiver and a transmitter, having a receiver impairment $r_i$ and a transmitter impairment $t_i$, respectively. The processing unit adapted to be connected to antennas i of the first antenna group, and to antennas j of the second antenna group. Further, the processing unit comprises a processing circuitry and a memory, where the memory contains instructions being executable by said processing circuitry whereby the processing unit is operative to initiate each transmitter of the antennas i in the first antenna group, to transmit a mutually orthogonal signal $C_i$ during a first duration. The processing unit is further operative to initiate each receiver of the antennas j in a second group of said two antenna groups, to receive a signal $Y_j$ during the first duration. The processing unit is further operative to initiate each transmitter of the antennas j in the second antenna group, to transmit a mutually orthogonal signal $C_j$ during a second duration, where the first and second durations are separated in time. The processing unit is further operative to initiate each receiver of the antennas i in the first antenna group, to receive a signal $Y_i$ during the second duration. The processing unit is also operative to determine relations between the receiver impairment $r_i$, the transmitter impairment $t_i$, of the first antenna group, to the receiver impairment $r_j$, and the transmitter impairment $t_j$, of the second antenna group, based on received signals $Y_i$, $Y_j$, orthogonal signals $C_i$, $C_j$, and assumed OTA channel reciprocity. Also, the processing unit is operative to calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, such that the quota of the receiver impairment $r_i$, to the transmitter impairment $t_i$, equals to at least one quota of the receiver impairment $r_j$, to the transmitter impairment $t_j$, thereby providing reciprocity calibration of antennas in the first and second antenna groups in the D-MIMO system.

Examples and embodiments as described have one or more of the following advantages and preferable features:

Since calibration measurements are needed at two occasions only, it is an advantage that the impact on ongoing traffic is decreased, or even minimized, when the calibration is performed during run-time, performing calibration on e.g. per minute basis.

Embodiments herein also allow for having several reference antennas, or anchor points, for each antenna calibration. This enables the issue of calibrating antennas in a distributed multiple input-multiple output system where at least one antenna pair has too high a path loss, meaning that they cannot communicate with each other. By taking several anchor points into account, all antennas can be calibrated in such a distributed multiple input-multiple output system.

By taking several antenna branches into account, i.e. by threading several antenna branches through one anchor path, desired calibration accuracy is reached. Only a minimum number of measurements is needed and all possible links, among said several antenna branches, may be considered in iterations for increased accuracy.

BRIEF DESCRIPTION OF THE DRAWINGS

Embodiments will now be described in more detail, and with reference to the accompanying drawings, in which:

FIG. 4 illustrates a flow chart of method actions performed in a processing unit according to embodiments of the present disclosure;

FIG. 5 schematically illustrates a D-MIMO system, according to embodiments of the present disclosure; and FIG. 6 schematically illustrates a processing unit, according to embodiments of the present disclosure.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

Hence, there is a demand for an improved technique circumventing or at least diminishing issues associated to reciprocity calibration in D-MIMO systems.

Embodiments of the present disclosure provide calibration of a D-MIMO system that comprises a number of antennas or antenna branches, based on two measurements only. A single measurement is herein regarded as simultaneous transmission and receipt of two or more antennas.

Embodiments herein are based upon transmitting orthogonal calibration signals simultaneously on several antenna branches, while during transmitting, receiving a signal components of the orthogonal calibration signals at several other antenna branches.

The proposed embodiments provide reciprocity calibration for a D-MIMO system, even though the system comprises antenna pairs that can practically not "hear" each other, i.e. having too high a path loss. Two separate measurements or occasions of simultaneous calibration signal transmission and receipt, are needed only.

Embodiments provide a method and an arrangement of calibration of a D-MIMO system comprising several antenna branches from said only two measurements. Since calibration measurements are needed at two occasions only, the impact on ongoing traffic is decreased, or even minimized, when the calibration is performed during run-time, performing calibration on e.g. per minute basis.

Embodiments herein also allow for having several reference antennas, or anchor points, for each antenna calibration. This enables the issue of calibrating antennas in a D-MIMO system where at least one antenna pair has too high a path loss, meaning that they cannot communicate with each other. By taking several anchor points into account, all antennas can be calibrated in such a D-MIMO system.

By using several antenna branches into account, i.e. by threading several antenna branches through one anchor path, desired calibration accuracy is reached. Only a minimum number of measurements is needed and all possible links, among said several antenna branches, may be considered in iterations for increased accuracy.

Figure 1:
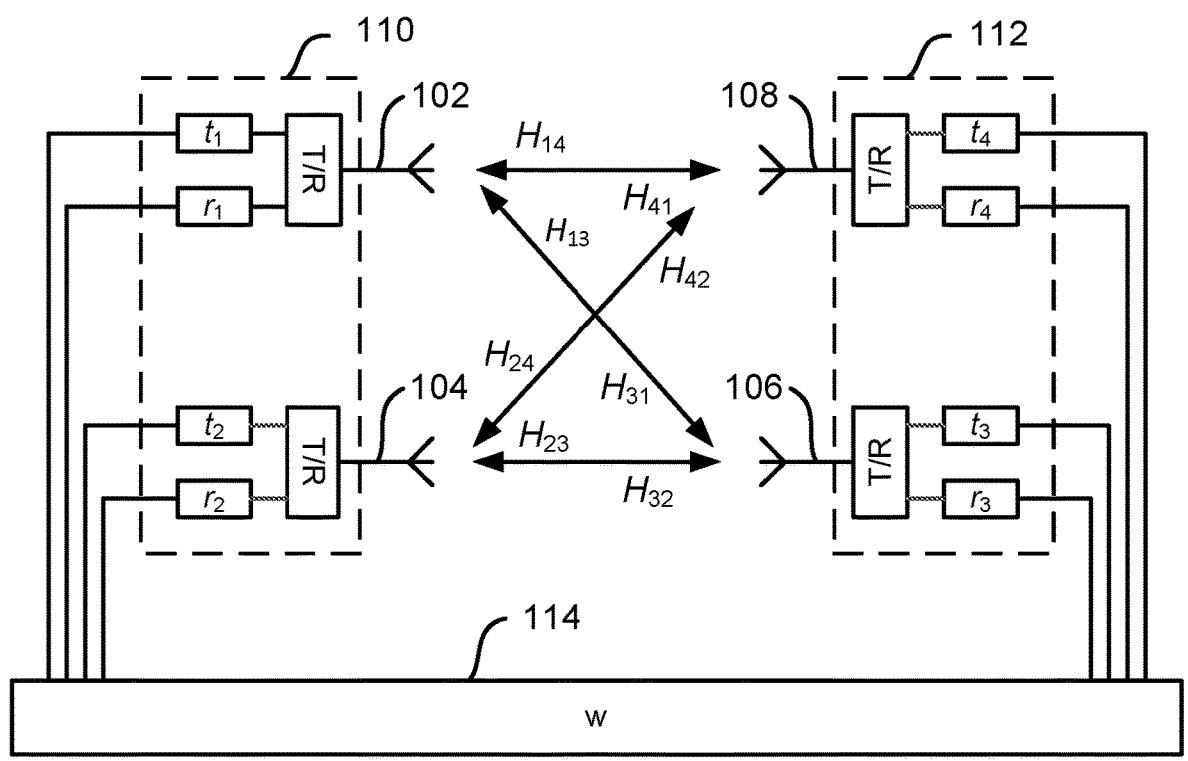
FIG. 1 schematically illustrates a scenario with a 4-antenna D-MIMO system, according to embodiments of the present disclosure.

FIG. 1 schematically illustrates a scenario with a 4-antenna D-MIMO system comprising a first 102, a second 104, a third 106 and a fourth 108 antenna. The first 102 and second 104 antennas are co-located in a first radio unit 110, whereas the third 106 and fourth 108 antennas are co-located in a second radio unit 112. The first 110 and second 112 radio units are interconnected by a processing unit w, 114, which may be placed in a central node, for instance a digital unit, DU.

Each one of the radio units 110, 112 comprises a transmitter/receiver switch, T/R, for switching between a transmitter and a receiver for each antenna. Transmitter and receiver impairments are denoted $t_i$ and $r_i$, respectively. Each receiver and transmitter impairment comprises a gain and a phase.

Arrows in FIG. 1 indicate OTA channel paths between respective antenna pair, i and j, which paths are used for reciprocity calibration herein.

It is noted that parameters being used herein are defined as narrow-band entities, which implies that they may be considered to be flat across a bandwidth, typically the subcarrier bandwidth of an orthogonal frequency-division multiplexing (OFDM) system.

This implies that each wireless, or OTA, channel and each transmitter/receiver can be represented by a complex number, having amplitude and phase, across this bandwidth.

In case of a wideband response, calibration can be achieved by dividing measured wideband responses and transfer functions into narrowband portions, by means of fast Fourier transform (FFT) operations. Operations involving FFT and inverse FFT (iFFT) are considered straightforward and are not described herein.

In the following, embodiments will be described in relation to FIG. 1. The calibration signal to be transmitted by each antenna is denoted $C_i$. The radio channel response, or path response from antenna i to antenna j is denoted $H_{ij}$. The transmitter impairments associated with antenna i is denoted $t_i$, where the receiver impairment associated with antenna i is denoted $r_i$ respectively. The received signal at receiver i is denoted $Y_i$.

Moreover, herein all antennas cannot communicate will each other. The path loss between certain antennas pairs does not allow a communication between said antennas pairs. In some cases, the path loss is too high, for which reason a signal transmitted by one antennas in said pair of antennas will only be received with no, or too low, signal intensity, which makes communication over the antenna pair undoable.

Also, between certain antennas, especially between antenna branches within one and the same radio unit, the antennas can have a coupling between each other, which if simultaneously transmitting using one antenna branch and receiving using another antenna branch within the same radio unit, saturates the receiver. Practically, antennas within the same radio unit, typically cannot communicate with each other.

In FIG. 1, there is hence no arrow internally between the first 102 antenna and the second 104 antenna in radio unit 110, and no arrow internally between the third antenna 106 and the fourth antenna 108 antenna in radio unit 112.

The first antenna 102 and the second antenna 104 form a first antenna group. As these two antennas are located in the same radio unit, the path loss between the first antenna and the second antenna is too low, due to too high a coupling between the two antennas.

The third antenna 106 and the fourth antennas 108 form a second antenna group. Similarly, since these two antennas, i.e. the third and fourth antennas, are located in the same radio unit, the path loss between the third antenna and the fourth antenna is too low, due to too high a coupling between the two antennas.

During a first duration, or a so called first measurement, the third antenna 106 transmits an orthogonal signal $C_3$ using the transmitter impairment $t_3$ of said third antenna 106, and the fourth antenna 108 transmits an orthogonal signal $C_4$ using the transmitter impairment $t_4$ of said fourth antenna 108.

During said first duration, or the so called first measurement, the first antenna 102 receives a signal $Y_1$ using the receiver impairment $r_1$ of said first antenna 102. Also, during said first duration, or the so called first measurement, the second antenna 104 receives a signal $Y_2$ using the receiver impairment $r_2$ of said second antenna 104.

When the third antenna 106 transmits, it transmits the orthogonal signal $C_3$ to the first antenna 102 over the radio channel response, or path response $H_{13}$, and transmits the orthogonal signal $C_3$ to the second antenna 104 over the radio channel response, or path response $H_{23}$.

At the same time as the third antenna transmits the orthogonal signal $C_3$, the fourth antenna 108 the orthogonal signal $C_4$ to the first antenna 102 over the radio channel response, or path response $H_{14}$, and transmits the orthogonal signal $C_4$ to the second antenna 104 over the radio channel response, or path response $H_{24}$.

During this first duration antennas from the first antenna group thus receive signals, whereas antennas from the second antenna group transmit orthogonal signals.

The first measurement, as described in this scenario, can thus be described using equation [1] and [2] below:

$$Y_1 = C_3 \cdot t_3 \cdot H_{13} \cdot r_1 + C_4 \cdot t_4 \cdot H_{14} \cdot r_1 \qquad [1]$$

$$Y_2 = C_3 \cdot t_3 \cdot H_{23} \cdot r_2 + C_4 \cdot t_4 \cdot H_{24} \cdot r_2 \qquad [2]$$

Similarly during the second duration, or the so called second measurement, the first antenna 102 transmits an orthogonal signal $C_1$ using the transmitter impairment $t_1$ of said first antenna 102.

Also, the second antenna 104 transmits an orthogonal signal $C_2$ using the transmitter impairment $t_2$ of said second antenna 104.

During said second duration, or the so called second measurement, the third antenna 106 receives a signal $Y_3$ using the receiver impairment $r_3$ of said third antenna 106. Also, during said second duration, or the so called second measurement, the fourth antenna 108 receives a signal $Y_4$ using the receiver impairment $r_4$ of said fourth antenna 108.

When the first antenna 102 transmits, it transmits the orthogonal signal $C_1$ to the third antenna 106 over the radio channel response, or path response $H_{31}$, and transmits the orthogonal signal $C_1$ to the fourth antenna 108 over the radio channel response, or path response $H_{41}$.

At the same time as the first antenna transmits the orthogonal signal $C_1$, the second antenna 104 transmits the orthogonal signal $C_2$ to the third antenna 106 over the radio channel response, or path response $H_{32}$, and transmits the orthogonal signal $C_2$ to the fourth antenna 108 over the radio channel response, or path response $H_{42}$.

During this second duration antennas from the first antenna group thus transmit signals, whereas antennas from the second antenna group receive signals.

The second measurement, as described in this scenario, can thus be described using equation [3] and [4] below:

$$Y_3 = C_1 \cdot t_1 \cdot H_{31} \cdot r_3 + C_2 \cdot t_2 \cdot H_{32} \cdot r_3 \qquad [3]$$

$$Y_4 = C_1 \cdot t_1 \cdot H_{41} \cdot r_4 + C_2 \cdot t_2 \cdot H_{42} \cdot r_4 \qquad [4]$$

It should be noted that the first and second measurements, will have to be performed close in time in such that the properties of channel responses can be estimated to be reciprocal, where $H_{ij} = H_{ji}$.

The signals simultaneously transmitted from antennas within one and the same antenna group need to be orthogonal. Herein, $C_1$ and $C_2$ have to be orthogonal to each other during the first measurement. Herein, $C_3$ and $C_4$ have to be orthogonal to each other during the second measurement. Orthogonality may be achieved by transmitting mutually time-domain and/or frequency-domain orthogonal sequences $C_i$ and $C_j$, or by transmitting sequences at mutually slightly offset frequency raster.

For reciprocity calibration, or relative DL-UL calibration, it is desirable to obtain quotas of receiver impairment to transmitter impairment for antenna from a first antenna group, i.e. $r_i/t_i$, in relation to $r_j/t_j$ for all combinations of antenna pairs within a D-MIMO system.

By the use of substitutions equations [1]-[4] can be rewritten.

For equation [1], let $$X_{13} = t_3 \cdot H_{13} \cdot r_1 \qquad [5]$$

$$X_{14} = t_4 \cdot H_{14} \cdot r_1, \qquad [6]$$

and for equation [2], let $$X_{23} = t_3 \cdot H_{23} \cdot r_2 \qquad [7]$$

$$X_{24} = t_4 \cdot H_{24} \cdot r_2 \qquad [8]$$

Similarly, for equation [3], let $$X_{31} = t_1 \cdot H_{31} \cdot r_3 \qquad [9]$$

$$X_{32} = t_2 \cdot H_{32} \cdot r_3, \qquad [10]$$

and for equation [4], let $$X_{41} = t_1 \cdot H_{41} \cdot r_4 \qquad [11]$$

$$X_{42} = t_2 \cdot H_{42} \cdot r_4 \qquad [12]$$

Now, rewrite equations [1]-[4] using equations [5]-[12] into equations [13]-[16], respectively:

$$Y_1 = C_3 \cdot X_{13} + C_4 \cdot X_{14} = [C_3 \; C_4]\begin{bmatrix} X_{13} \\ X_{14} \end{bmatrix} \qquad [13]$$

$$Y_2 = C_3 \cdot X_{32} + C_4 \cdot X_{24} = [C_3 \; C_4]\begin{bmatrix} X_{32} \\ X_{24} \end{bmatrix} \qquad [14]$$

$$Y_3 = C_1 \cdot X_{31} + C_2 \cdot X_{32} = [C_1 \; C_2]\begin{bmatrix} X_{31} \\ X_{32} \end{bmatrix} \qquad [15]$$

$$Y_4 = C_1 \cdot X_{41} + C_2 \cdot X_{42} = [C_1 \; C_2]\begin{bmatrix} X_{41} \\ X_{42} \end{bmatrix} \qquad [16]$$

Equations [13]-[16] can now be solved for $X_{ij}$ by using the orthogonality of the calibration signals $C_i$. Due to that the calibration signals $C_i$ are orthogonal, each measured $Y_i$ may thus here be divided into two terms, from which $X_{ij}$ can be solved knowing $C_i$.

Moreover, for time division duplex (TDD) within a coherent window, that is having performed the two measurements within said time window, the channel responses may be regarded to be reciprocal, for which reason $H_{ij} = H_{ji}$ applies. By applying this channel reciprocity to the solved $X_{ij}$ the following relations are obtained.

$$\frac{X_{31}}{t_1 \cdot r_3} = \frac{X_{13}}{t_3 \cdot r_1} \qquad [17]$$

$$\frac{X_{41}}{t_1 \cdot r_4} = \frac{X_{14}}{t_4 \cdot r_1} \qquad [18]$$

$$\frac{X_{32}}{t_2 \cdot r_3} = \frac{X_{23}}{t_3 \cdot r_2} \qquad [19]$$

$$\frac{X_{42}}{t_2 \cdot r_4} = \frac{X_{24}}{t_4 \cdot r_2} \quad [20]$$

Rewriting equations [17]-[20] in the form $r_i/t_i$ as a function of $r_j/t_j$, equations [21]-[24] are obtained.

$$\frac{r_3}{t_3} = \frac{r_1}{t_1}\frac{X_{31}}{X_{13}} \quad [21]$$

$$\frac{r_3}{t_3} = \frac{r_2}{t_2}\frac{X_{32}}{X_{23}} \quad [22]$$

$$\frac{r_4}{t_4} = \frac{r_1}{t_1}\frac{X_{41}}{X_{14}} \quad [23]$$

$$\frac{r_4}{t_4} = \frac{r_2}{t_2}\frac{X_{42}}{X_{24}} \quad [24]$$

It is noted equation [21] relates antenna 3 to antenna 1, whereas equation [22] relates antenna 3 to antenna 2. It is hence here possible to relate antenna 3 and 4 to either antenna 1 or antenna 2. Antenna 1 and antenna 2 may here function as a so called compensation anchor point, being an antenna to which all other antennas relate. Down below, antenna 1 is used as the compensation anchor point.

Equation [21] and [23], relate antenna 3 and 4 to antenna 1, directly.

By combining equations [21] and [22], equation [25] is obtained, relating antenna 2 to antenna 1.

$$\frac{r_2}{t_2} = \frac{r_1}{t_1}\frac{X_{31}}{X_{13}}\frac{X_{23}}{X_{32}} \quad [25]$$

Alternatively, by combining equations [23] and [24], equation [26] is obtained, also relating antenna 2 to antenna 1.

$$\frac{r_2}{t_2} = \frac{r_1}{t_1}\frac{X_{41}}{X_{14}}\frac{X_{24}}{X_{42}} \quad [26]$$

Both equation [25] and [26] involve comprise a two-stage compensation for relating antenna 2 to antenna 1. A two-stage compensation or relation has the implication that the relation may be less well-defined, as compared to a one-stage compensation or relation, as for antennas 3 and 4, above.

It is observed that equation [25] and [26] are independent estimates of $r_2/t_2$, in relation to $r_1/t_1$.

A mean value of the two independent estimates from equation [25] and [26] removes some statistical error and hence creates an improved estimate of the quota.

Having achieved equations [21]-[26], a calibration compensation for each antenna, relative to the anchor antenna, can now be applied.

It is noted that calibration achieves that quota $r_i/t_i$ for i=2, 3 or 4 equals to quota $r_1/t_1$.

Let $$r_i/t_i = r_1/t_1 \times CF, \quad [27]$$

where CF is a calibration factor obtained based on the determined equations [21]-[26]. The calibrated quota $r_i^*/t_i^*$ are obtained by multiplying each $r_i/t_i$ by the inverse of the calibration factor, i.e. 1/CF, according to equation [28].

$$r_i/t_i^* = r_i/t_i \times 1/CF \quad [28]$$

The calibrated quotas $r_i^*/t_i^*$ fulfill the requirement for reciprocity calibration, i.e. that the quota $r_i/t_i$ for i=2, 3 or 4 equals to quota $r_1/t_1$, within this example.

For a certain quota $r_1/t_1$, a quota $r_i/t_i$ for i=2, 3 or 4, can thus be calculated for reciprocity. The $r_i/t_i$ quota may be calibrated by either calibrating 1) the receiver impairment $r_i$, 2) the transmitter impairment $t_i$ or 3) both the receiver impairment n and the transmitter impairment $t_i$, Having adjusted the measured quotas such that the equations are fulfilled, reciprocity calibration has been achieved in the D-MIMO system. Each receiver and transmitter impairment comprises a gain and a phase, which means that calibration may be achieved by more than one single setting of the impairments.

It has thus been described how to achieve reciprocity calibration from two measurements only, i.e. transmission and reception of calibration signals OTA at two separate durations.

Figure 2:
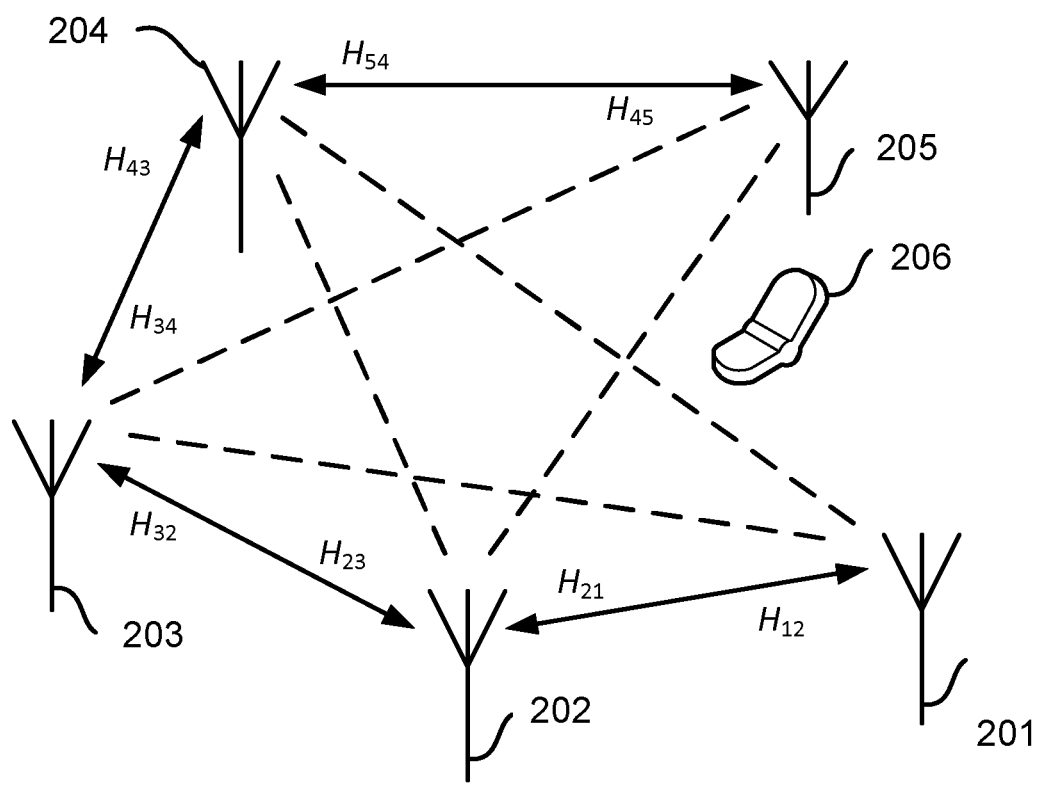
FIG. 2 schematically illustrates a UE-antenna scenario within a 5-antenna D-MIMO system, according to embodiments of the present disclosure.

FIG. 2 schematically illustrates a UE-antenna scenario within a 5-antenna D-MIMO system, according to embodiments of the present disclosure. The 5-antenna D-MIMO system comprises antenna 1, 201; antenna 2, 202; antenna 3, 203; antenna 4, 204; and antenna 5, 205. According to the illustrated scenario, a user equipment (UE) 206 is located in a position between antenna 1, 201 and antenna 5, 205. It is noted that there is a response path from antenna 1, 201 and to antenna 2, 202, i.e. $H_{21}$, and one from antenna 2, 202 to antenna 1, 201, i.e. $H_{12}$. There is also a response path from antenna 2, 202 to antenna 3, 203, i.e. $H_{32}$, and one from antenna 3, 203 to antenna 2, 202, i.e. $H_{23}$. Similarly, there are response paths between antenna 3, 203 and antenna 4, 204, and between antenna 4, 204 and antenna 5, 205. However, there is practically no response path between antenna 1, 201 and antenna 5, 205. Such a practically non-existing response path may also be considered to be equivalent to a path loss that is higher than an upper path loss threshold, such that the path loss between the two antennas 1 and 5, is indifferent from no existing path, at least for practical purposes.

This may be represented by a tall wall or a building or the like, strongly reducing any potential path response between antenna 1 and antenna 5.

By using traditional methods, for instance according to prior art, a direct path response is a critical prerequisite for calibration of antennas.

This is in contrast to the present disclosure in which, a relationship between antenna 1 and antenna 5 can be calculated without being negatively influenced by any weak path response of a link or path between the two antennas.

The antennas in the 5-antenna D-MIMO are divided in two separate antenna groups, antenna group 1 and antenna group 2. Antenna group 1 comprises antenna 1, antenna 3 and antenna 5. Antenna group 2 comprises antenna 2 and antenna 4, thus being separate from antenna group 1.

It is noted that the response path between antennas within antenna group 1 typically has a path loss that is higher than the upper response threshold.

How to divide antennas to form the two antennas groups falls outside of the scope of this disclosure. It can however briefly be mentioned that based on random experiments, an anchor path comprising pairwise the strongest path response between an antenna and all other nodes. Antenna 1 has a strongest path response to antenna 2. Antenna 2 then has a strongest further response to antenna 3, and so son. Solid arrows here denote the anchor path in the present scenario. One way of dividing antennas into antenna groups may be to group every second antenna along an anchor path in a first antenna group, and the remaining antennas in a second group. Adjacent antennas will thus be divided into separate and different antenna groups.

For the reciprocity calibration of such a D-MIMO system, two measurements are required, according to the present disclosure.

Transmitting calibration signals by all antennas in the same antenna group and simultaneous receipt by all antennas in the other antenna group is thus now performed.

During a first duration, i.e. in a first measurement, orthogonal calibration signals are transmitted at antenna 1, 201; antenna 3, 203, and antenna 5, 205, while at the same time receiving at antenna 2 and antenna 4 of the second antenna group.

The signal being detected by antenna 2, 202 has one component from orthogonal signal $C_1$ as transmitted using transmitter impairment $t_1$ of antenna 1, 201 and another component from orthogonal signal $C_3$ as transmitted using transmitter impairment $t_3$ of antenna 3, 203.

The signal being detected by antenna 4, 204 has one component from orthogonal signal $C_3$ as transmitted using transmitter impairment $t_3$ of antenna 3, 203 and another component from orthogonal signal $C_5$ as transmitted using transmitter impairment $t_5$ of antenna 5, 205.

Following a pattern similar to the one as described in relation FIG. 1, the following signals as received by antenna 2 and antenna 4 become:

$$Y_2 = C_1 \cdot t_1 \cdot H_{21} \cdot r_2 + C_3 \cdot t_3 \cdot H_{23} \cdot r_2 \quad [29]$$

$$Y_4 = C_3 \cdot t_3 \cdot H_{43} \cdot r_4 + C_5 \cdot t_5 \cdot H_{45} \cdot r_4 \quad [30]$$

During the second duration, i.e. in a second measurement, orthogonal signals are transmitted by antennas 2 and 4, while simultaneously receiving signals at antennas 1, 201, at antenna 3, 203 and at antenna 5, 205.

Similar to above, signals received using receiver impairments $r_1$, $r_3$ and $r_5$, respectively, become:

$$Y_1 = C_2 \cdot t_2 \cdot H_{12} \cdot r_1 \quad [31]$$

$$Y_3 = C_2 \cdot t_2 \cdot H_{32} \cdot r_3 + C_4 \cdot t_4 \cdot H_{34} \cdot r_3 \quad [32]$$

$$Y_5 = C_4 \cdot t_4 \cdot H_{54} \cdot r_5 \quad [33]$$

It is here noted that antenna 1, 201 only receives a signal as transmitted from antenna 2. Antenna 3, 203 receives a signal having a first component as transmitted from antenna 2, 202, and a second component as transmitted from antenna 4, 204. Antenna 5 only receives a signal transmitted from antenna 4, 204.

By applying similar substitutions as applied in relation FIG. 1, and performing similar calculations assuming reciprocity as valid within a reciprocity window, the following relations are achieved:

$$\frac{r_2}{t_2} = \frac{r_3}{t_3} \frac{X_{23}}{X_{32}} \quad [34]$$

$$\frac{r_1}{t_1} = \frac{r_2}{t_2} \frac{X_{12}}{X_{21}} = \frac{r_3}{t_3} \frac{X_{23}}{X_{32}} \frac{X_{12}}{X_{21}} \quad [35]$$

$$\frac{r_4}{t_4} = \frac{r_3}{t_3} \frac{X_{43}}{X_{34}} \quad [36]$$

$$\frac{r_5}{t_5} = \frac{r_4}{t_4} \frac{X_{54}}{X_{45}} = \frac{r_3}{t_3} \frac{X_{43}}{X_{34}} \frac{X_{54}}{X_{45}} \quad [37]$$

From equations [34]-[37] the so called calibrations factors, CF, are thus obtained, by the use of which the quotas can be calibrated or recalculated, such that any two quotas of receiver to transmitter impairment are equal.

In the event that additional antenna pairs of the antennas above, a calibration accuracy can be improved by reducing stochastic error sources stemming from different measurement paths.

It has thus been demonstrated that reciprocity calibrations can be obtained by measuring at two occasions in time, i.e. from two measurements only.

Figure 3:
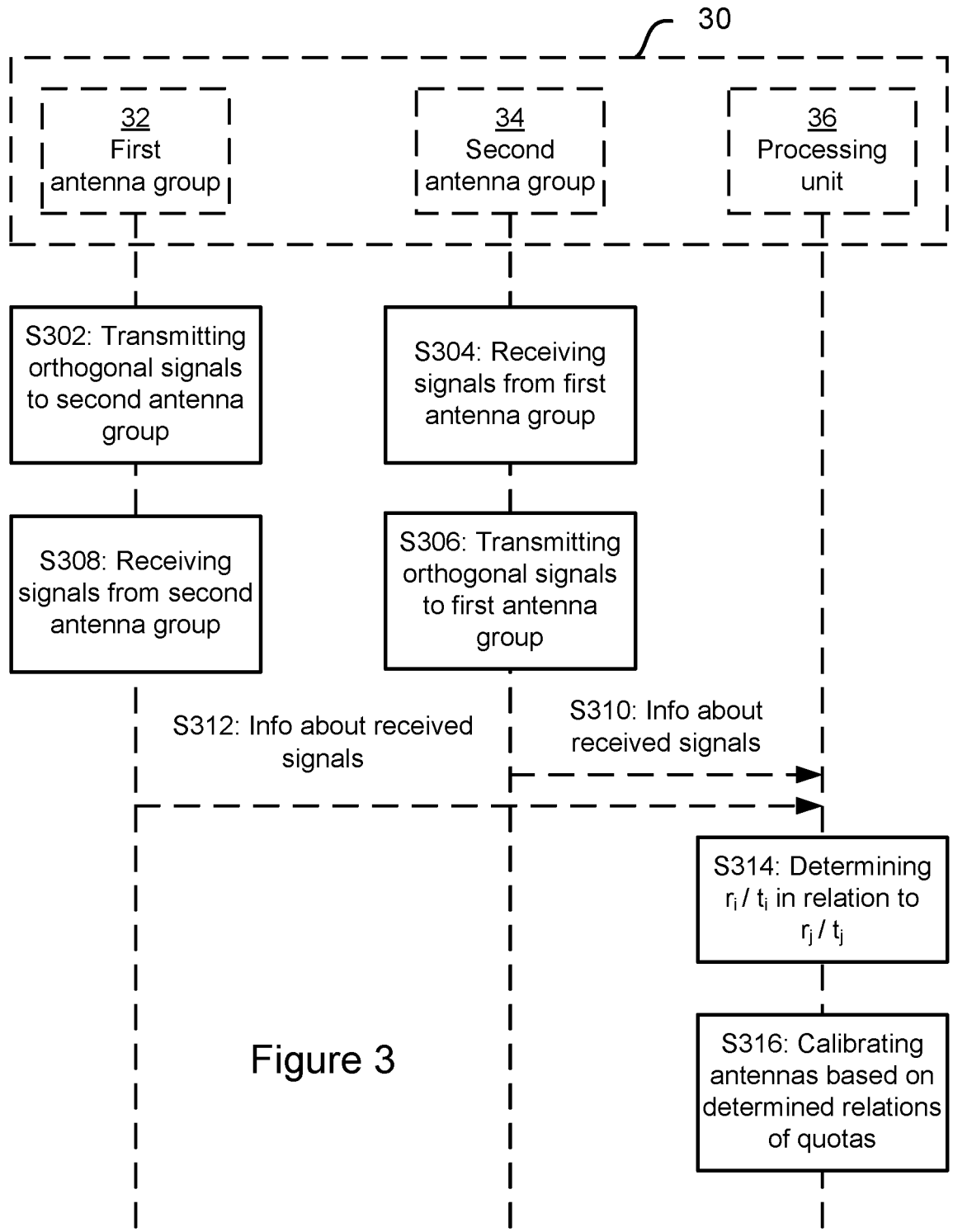
FIG. 3 illustrates a handshake diagram within a D-MIMO system, related to embodiments of the present disclosure.

FIG. 3 illustrates a handshake diagram within a distributed multiple input-multiple output (D-MIMO) system 30, related to embodiments of the present disclosure. The D-MIMO system 30 comprises a first antenna group 32, a second antenna group 34, and a processing unit 36. The first 32 and second 34 antenna groups are connected to the processing unit 36 (not shown). Each antenna pair of antennas i in at least the first antenna group of said first and second antenna groups, has a path loss that is either above a first path loss threshold, or below a second path loss threshold, where the first path loss threshold being substantially higher than the second path loss threshold. Each path having a path loss above a first path loss threshold, implicates that each path response is weaker than a corresponding first path response threshold. Each path having a path loss below a second path loss threshold, implicates that each path response is stronger than a corresponding path response threshold.

Path losses as above, i.e. outside the threshold implicates that a signal quality to be received within said at least a first antenna group is not sufficient for reception of data.

At the same time path losses within the thresholds enables reception of sufficient signal quality of one antenna group when transmitted from the other of the two separate groups of antennas.

The following handshake diagram comprises:

Action S302: The first antenna group 32 transmitting orthogonal signals to the second antenna group 34.

Action S304: At the same time as S302, the second antenna group 34 receiving signals from the first antenna group 32.

Action S306: The second antenna group 34 transmitting orthogonal signals to the first antenna group 32.

Action S308: At the same time as S306, the first antenna group 32 receiving signals from the second antenna group 34.

Action S310: The second antenna group 34 sending information about received signals to the processing unit 36. This information typically comprises the strength of signals received in action S304.

Action S312: The first antenna group 32 sending information about received signals to the processing unit 36. This information typically comprises the strength of signals received in action S306.

Action 314: The processing unit 36 determining $r_i/t_i$ in relation to $r_j/t_j$ for reciprocity. This action is based in the received signals in steps S310 and S312, and on an assumed reciprocity in the D-MIMO.

Action S316: The processing unit 38 calibrating antennas based on the determined relations of the quotas; said relations as determined in action S314. Calibrated antennas are such that quotas of receiver to transmitter impairments of antennas in one group equal to quotas of receiver to transmitter impairments of antennas in another group.

FIG. 4 illustrates a flow chart of method actions performed in a processing unit according to embodiments of the present disclosure.

These actions form one or more embodiments of a method of OTA reciprocity calibration for a D-MIMO system. The D-MIMO system comprises two separate antenna groups, where each antenna pair of antennas i in at least a first group of said two separate antenna groups, has a path loss that is either above a first path loss threshold, or below a second path loss threshold, the first path loss threshold being substantially higher than the second path loss threshold, where each antenna i has a receiver impairment $r_i$ and a transmitter impairment $t_i$, the method comprising the following actions:

Action 42: Transmitting S302 by each transmitter of the antennas i in the first group, an orthogonal signal $C_i$, and receiving S304 by each receiver of antennas j in a second group of said two separate antenna groups a signal $Y_j$ during a first duration.

Action 44: Transmitting S306 by each transmitter of the antennas j in the second group, an orthogonal signal $C_j$ and receiving S308 by each receiver of the antennas i in the first group a signal $Y_i$; during a second duration, where the first and the second time durations are separated in time.

Action 46: Determining relations between the receiver impairment $r_i$, the transmitter impairment $t_i$, of the first group of antennas, to the receiver impairment $r_j$, and the transmitter impairment $t_j$, of the second group of antennas, based on received signals $Y_i$, $Y_j$, orthogonal signals $C_i$, $C_j$, and assumed OTA channel reciprocity.

Action 48: Calibrating a quota of the receiver impairment $r_i$, to the transmitter impairment $t_i$, in relation to at least one quota of the receiver impairment $r_j$, to the transmitter impairment $t_j$, based on the determined relations for radio response reciprocity, such that the quota of the receiver impairment $r_i$, to the transmitter impairment $t_i$, equal to at least one quota of the receiver impairment $r_j$, to the transmitter impairment $t_j$, providing reciprocity calibration of antennas in the first and second antenna groups in the D-MIMO system.

Transmitting 42, 44, S302, S306 a mutually orthogonal signal within the method, may comprise transmitting a calibration signal that is orthogonal to all other calibration signals being transmitted from antennas within the same antenna group.

Transmitting 42, 44, S302, S306 by each one of said antennas in the first or second antenna group within the method may comprise, simultaneously transmitting by each one of said antennas in the first or second antenna group.

Receiving 42, 44, S304, S308 by each one of the antennas in the first or second antenna group in the method may comprise simultaneously receiving by each one of said antennas in the first or second antenna group.

Calibrating 48, S316 the quota of the receiver impairment $r_i$, to the transmitter impairment $t_i$ within the method may comprise adjusting the receiver impairment $r_i$, the transmitter impairment $t_i$, or both the receiver impairment $r_i$ and the transmitter impairment $t_i$.

The present disclosure also comprises a computer program for OTA, reciprocity calibration for a D-MIMO, system, comprising instructions which, when executed on at least one processor, cause the at least one processors to carry out the method according to any one of the actions as described above.

The present disclosure also comprises a computer-readable storage medium, having thereon a computer program stored, as described above.

FIG. 5 schematically presents a D-MIMO system 50, according to embodiments of the present disclosure. The D-MIMO system is capable of over-the-air (OTA) reciprocity calibration.

The system comprises two separate antenna groups 32, 34, 52, 54, wherein each antenna pair of antennas i of a first group of said two antennas groups, is adapted to have a path loss that is either above a first path loss threshold, or below a second path loss threshold. The first path loss threshold is substantially higher than the second path loss threshold. Each antenna has a receiver and a transmitter, having a receiver impairment $r_i$ and a transmitter impairment $t_i$, respectively. Each transmitter of the antennas i in the first antenna group is adapted to transmit, a mutually orthogonal signal $C_i$ during a first duration. Each receiver of the antennas j in a second group of said two separate antenna groups is adapted to receive a signal $Y_j$ during the first duration. Each transmitter of the antennas j in the second antenna group is adapted to transmit a mutually orthogonal signal $C_j$ during a second duration. Each receiver of the antennas i in the first antenna group is adapted to receive a signal $Y_i$ during the second duration, where the first and second durations are separated in time.

The system 50 also comprises a processing unit 36, 56 that is adapted to be connected to antennas i of the first antenna group, and to antennas j of the second antenna group. The processing unit 36, 56 is operative to initiate each transmitter of the antennas i in the first antenna group, to transmit a mutually orthogonal signal $C_i$ during a first duration. The processing unit 36, 56 is also operative initiate each receiver of the antennas j in the second antenna group, to receive a signal $Y_j$ during the first duration. The processing unit 36, 56 is further operative to initiate each transmitter of the antennas j in the second antenna group, to transmit a mutually orthogonal signal $C_j$ during a second duration, where the first and second durations are separated in time. The processing unit 36, 56 is also operative to initiate each receiver of the antennas i in the first antenna group, to receive a signal $Y_i$ during the second duration. Also, the processing unit is operative to determine relations between the receiver impairment $r_i$, the transmitter impairment $t_i$, of the first antenna group, to the receiver impairment $r_j$, and the transmitter impairment $t_j$, of the second antenna group, based on received signals $Y_i$, $Y_j$, mutually orthogonal signals $C_i$, $C_j$, and assumed OTA channel reciprocity. In addition, the processing unit is operative to calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, such that the quota of the receiver impairment $r_i$, to the transmitter impairment $t_i$, equal to at least one quota of the receiver impairment $r_j$, thereby providing reciprocity calibration of antennas in the first and second antenna groups in the D-MIMO system.

The processing unit 36, 56 within the system may further be operative to initiate transmission of a calibration signal that is orthogonal to all other calibration signals to be transmitted from antennas within the same antenna group The processing unit 36, 56 of the system may also be operative to simultaneously initiate each one of said antennas in the first or second antenna group to transmit.

The processing unit 36, 56 of the system may also be operative to simultaneously initiate each one of said antennas in the first or second antenna group to receive.

The processing unit 36, 56 of the system may be operative to determine relations between a quota of the receiver impairment $r_i$, to the transmitter impairment $t_i$, of the first antenna group, and quotas of the receiver impairment $r_j$, to the transmitter impairment $t_j$, of the second antenna group, based on received signals $Y_i$, $Y_j$, mutually orthogonal signals $C_i$, $C_j$, and assumed OTA channel reciprocity. It is noted that signals $C_i$ are mutually orthogonal. It is also noted that signals $C_j$ are mutually orthogonal.

The processing unit 36, 56 of the system may also be operative to adjust the receiver impairment $r_i$, the transmitter impairment $t_i$, or both the receiver impairment $r_i$ and the transmitter impairment $t_i$, such that the determined relations for radio response reciprocity are fulfilled, thereby providing reciprocity calibration of antennas in the first and second antenna groups in the D-MIMO system.

The processing unit 36, 56 of the system 50 may comprise a beamforming processing unit located within a central node, preferably a digital unit (DU).

The present disclosure also comprises a distributed multiple input-multiple output (D-MIMO) system 30, 50 capable of over-the-air (OTA) reciprocity calibration. The D-MIMO system has two separate antenna groups, where each antenna pair of antennas i in at least a first group of said two separate antenna groups, has a path loss that is either above a first path loss threshold, or below a second path loss threshold, the first path loss threshold being substantially higher than the second path loss threshold, where each antenna i has a receiver impairment $r_i$ and a transmitter impairment $t_i$. The D-MIMO system is adapted to:

transmit by each transmitter of the antennas i in the first group, a mutually orthogonal signal $C_i$, and receive by each receiver of antennas j in a second group of said two separate antenna groups a signal $Y_j$ during a first duration;

transmit by each transmitter of the antennas j in the second group, a mutually orthogonal signal $C_j$ and receive by each receiver of the antennas i in the first group a signal $Y_i$; during a second duration, where the first and the second time durations are separated in time;

determine relations between the receiver impairment $r_i$, the transmitter impairment $t_i$, of the first group of antennas, to the receiver impairment $r_j$, and the transmitter impairment $t_j$, of the second group of antennas, based on received signals $Y_i$, $Y_j$, orthogonal signals $C_i$, $C_j$, and assumed OTA channel reciprocity; and calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, such that the quota of the receiver impairment $r_i$, to the transmitter impairment $t_i$, equals to at least one quota of the receiver impairment $r_j$, to the transmitter impairment $t_j$, providing reciprocity calibration of antennas in the first and second antenna groups in the D-MIMO system.

FIG. 6 schematically presents a processing unit 36, 56, 60 that is capable of over-the-air (OTA) reciprocity calibration of a distributed multiple input-multiple output (D-MIMO) system. The D-MIMO system comprises two separate antenna groups 32, 34, 52, 54, wherein each antenna pair of antennas i of a first group of said two antennas groups, is adapted to have a path loss that is either above a first path loss threshold, or below a second path loss threshold, the first path loss threshold being substantially higher than the second path loss threshold. Each antenna has a receiver and a transmitter, having a receiver impairment $r_i$ and a transmitter impairment $t_i$, respectively. The processing unit 36, 56, 60 is adapted to be connected to antennas i of the first antenna group, and to antennas j of a second group of said two separate antenna groups. Further, the processing unit 35, 56, 60 comprises a processing circuitry 62 and a memory 64, where the memory 64 contains instructions being executable by said processing circuitry 62 whereby the processing unit 36, 56, 60 is operative to initiate each transmitter of the antennas i in the first antenna group, to transmit a mutually orthogonal signal $C_i$ during a first duration. The processing unit 36, 56, 60 is further operative to initiate each receiver of the antennas j in the second antenna group, to receive a signal $Y_j$ during the first duration. The processing unit 36, 56, 60 is further operative to initiate each transmitter of the antennas j in the second antenna group, to transmit a mutually orthogonal signal $C_j$ during a second duration, where the first and second durations are separated in time. The processing unit 36, 56, 60 is further operative to initiate each receiver of the antennas i in the first antenna group, to receive a signal $Y_i$ during the second duration. The processing unit 36, 56, 60 is also operative to determine relations between the receiver impairment $r_i$, the transmitter impairment $t_i$, of the first antenna group, to the receiver impairment $r_j$, and the transmitter impairment $t_j$, of the second antenna group, based on received signals $Y_i$, $Y_j$, orthogonal signals $C_i$, $C_j$, and assumed OTA channel reciprocity. Also, the processing unit 36, 56, 60 is operative to calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, such that the quota of the receiver impairment $r_i$, to the transmitter impairment $t_i$, equals to at least one quota of the receiver impairment $r_j$, to the transmitter impairment $t_j$, thereby providing reciprocity calibration of antennas in the first and second antenna groups in the D-MIMO system.

The processing unit 36, 56, 60 may further be operative to initiate transmission of a calibration signal that is orthogonal to all other calibration signals to be transmitted from antennas within the same antenna group The processing unit 36, 56, 60 may also be operative to simultaneously initiate each one of said antennas in the first or second antenna group to transmit.

The processing unit 36, 56, 60 may also be operative to simultaneously initiate each one of said antennas in the first or second antenna group to receive.

The processing unit 36, 56, 60 may be operative to determine relations between a quota of the receiver impairment $r_i$, to the transmitter impairment $t_i$, of the first antenna group, and quotas of the receiver impairment $r_j$, to the transmitter impairment $t_j$, of the second antenna group, based on received signals $Y_i$, $Y_j$, mutually orthogonal signals $C_i$, $C_j$, and assumed OTA channel reciprocity.

The processing unit 36, 56, 60 may also be operative to adjust the receiver impairment $r_i$, the transmitter impairment $t_i$, or both the receiver impairment $r_i$ and the transmitter impairment $t_i$, such that the determined relations for radio response reciprocity are fulfilled, thereby providing reciprocity calibration of antennas in the first and second antenna groups in the D-MIMO system.

The processing unit 36, 56, 60 may comprise a beamforming processing unit located within a central node, preferably a digital unit (DU).

In addition, the present disclosure comprises a processing unit that is capable of OTA reciprocity calibration of a D-MIMO system. The D-MIMO system comprises two separate antenna groups 32, 34, 52, 54, wherein each antenna pair of antennas i of a first group of said two antennas groups, is adapted to have a path loss that is either above a first path loss threshold, or below a second path loss threshold, the first path loss threshold being substantially higher than the second path loss threshold. Each antenna has a receiver and a transmitter, having a receiver impairment $r_i$ and a transmitter impairment $t_i$, respectively. The processing unit is adapted to be connected to antennas i of the first antenna group, and to antennas j of the second antenna group. The processing unit 36, 56, 60 adapted to initiate each transmitter of the antennas i in the first antenna group, to transmit a mutually orthogonal signal $C_i$ during a first duration. The processing unit 36, 56, 60 is further adapted to initiate each receiver of the antennas j in a second group of said two separate antenna groups, to receive a signal $Y_j$ during the first duration. The processing unit 36, 56, 60 is further adapted to initiate each transmitter of the antennas j in the second antenna group, to transmit a mutually orthogonal signal $C_j$ during a second duration, where the first and second durations are separated in time. The processing unit 36, 56, 60 is further adapted to initiate each receiver of the antennas i in the first antenna group, to receive a signal $Y_i$ during the second duration. The processing unit 36, 56, 60 is also adapted to determine relations between the receiver impairment $r_i$, the transmitter impairment $t_i$, of the first antenna group, to the receiver impairment $r_j$, and the transmitter impairment $t_j$, of the second antenna group, based on received signals $Y_i$, $Y_j$, mutually orthogonal signals $C_i$, $C_j$, and assumed OTA channel reciprocity. In addition, the processing unit 36, 56, 60 is adapted to calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, such that the quota of the receiver impairment $r_i$, to the transmitter impairment $t_i$, equals to at least one quota of the receiver impairment $r_j$, thereby providing reciprocity calibration of antennas in the first and second antenna groups in the D-MIMO system.

Examples and embodiments as described herein have one or more of the following advantages and preferable features:

For the reason that calibration measurements are needed at two occasions only, it is an advantage that the impact on ongoing traffic is decreased, or even minimized, when the calibration is performed during run-time, performing calibration on e.g. per minute basis.

Embodiments herein also allow for having several reference antennas, or anchor points, for each antenna calibration. This enables the issue of calibrating antennas in a distributed multiple input-multiple output system where at least one antenna pair has too high a path loss, meaning that they cannot communicate with each other. By taking several anchor points into account, all antennas can be calibrated in such a distributed multiple input-multiple output system.

By taking several antenna branches into account, i.e. by threading several antenna branches through one anchor path, desired calibration accuracy is reached. Only a minimum number of measurements is needed and all possible links, among said several antenna branches, may be considered in iterations for increased accuracy.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

D-MIMO distributed-multiple input multiple output
DL downlink
DU digital unit
FFT fast Fourier transform
iFFT inverse fast Fourier transform
OFDM orthogonal frequency-division multiplexing
OTA over-the-air
RF radio frequency
RRU remote radio unit
TDD time division duplex
UE user equipment
UL uplink

The invention claimed is:

1. A method of over-the-air, OTA, reciprocity calibration for a distributed multiple input multiple output, D-MIMO, system, the D-MIMO system comprising two separate antenna groups, each antenna pair of antennas i in at least a first group of the two separate antenna groups having a path loss that is one of above a first path loss threshold and below a second path loss threshold, the first path loss threshold being higher than the second path loss threshold, each antenna i having a receiver impairment $r_i$ and a transmitter impairment $t_i$, the method comprising:

transmitting by each transmitter of the antennas i in the first group, a mutually orthogonal signal $C_i$, and receiving by each receiver of antennas j in a second group of the two separate antenna groups a signal $Y_i$ during a first duration;

transmitting by each transmitter of the antennas j in the second group, a mutually orthogonal signal $C_j$ and receiving by each receiver of the antennas i in the first group a signal $Y_i$ during a second duration, the first and the second time durations being separated in time;

determining relations between the receiver impairment $r_i$, the transmitter impairment $t_i$, of the first group of antennas, to the receiver impairment $r_j$, and the transmitter impairment $t_j$, of the second group of antennas, based on received signals $Y_i$, $Y_j$, mutually orthogonal signals $C_i$, $C_j$ and assumed OTA channel reciprocity; and calibrating a quota of the receiver impairment $r_i$, to the transmitter impairment $t_i$, in relation to at least one quota of the receiver impairment $r_j$, to the transmitter impairment $t_j$, based on the determined relations for radio response reciprocity, the quota of the receiver impairment $r_i$, to the transmitter impairment $t_i$, being equal to at least one quota of the receiver impairment $r_j$, to the transmitter impairment $t_j$, providing reciprocity calibration of antennas in the first and second antenna groups in the D-MIMO system.

2. The method according to claim 1, wherein transmitting the mutually orthogonal signal, comprises transmitting a calibration signal that is orthogonal to all other calibration signals being transmitted from antennas within the same antenna group.

3. The method according to claim 2, wherein transmitting by each one of the antennas in one of the first and second antenna group, comprises simultaneously transmitting by each one of the antennas in the one of the first and second antenna group.

4. The method according to claim 3, wherein receiving by each one of the antennas in one of the first and second antenna group comprises simultaneously receiving by each one of the antennas in the one of the first and second antenna group.

5. The method according to claim 2, wherein calibrating the quota of the receiver impairment $r_i$, to the transmitter impairment $t_i$, comprises adjusting the receiver impairment $r_i$, the transmitter impairment $t_i$, or both the receiver impairment $r_i$ and the transmitter impairment $t_i$.

6. The method according to claim 1, wherein transmitting by each one of the antennas in one of the first and second antenna group, comprises simultaneously transmitting by each one of the antennas in the one of the first and second antenna group.

7. The method according to claim 6, wherein receiving by each one of the antennas in one of the first and second antenna group comprises simultaneously receiving by each one of the antennas in the one of the first and second antenna group.

8. The method according to claim 1, wherein calibrating the quota of the receiver impairment $r_i$, to the transmitter impairment $t_i$, comprises adjusting the receiver impairment $r_i$, the transmitter impairment $t_i$, or both the receiver impairment $r_i$ and the transmitter impairment $t_i$.

9. A non-transitory computer storage medium storing a computer program for performing a method of over-the-air, OTA, reciprocity calibration for a distributed multiple input multiple output, D-MIMO, system, the D-MIMO system comprising two separate antenna groups, each antenna pair of antennas i in at least a first group of the two separate antenna groups having a path loss that is one of above a first path loss threshold and below a second path loss threshold, the first path loss threshold being higher than the second path loss threshold, each antenna i having a receiver impairment $r_i$ and a transmitter impairment $t_i$, the computer program comprising instructions which, when executed on at least one processor, cause the at least one processor to:
cause transmission by each transmitter of the antennas i in the first group, a mutually orthogonal signal $C_i$, and receiving by each receiver of antennas j in a second group of the two separate antenna groups a signal $Y_j$ during a first duration;
cause transmission by each transmitter of the antennas j in the second group, a mutually orthogonal signal $C_j$ and receiving by each receiver of the antennas i in the first group a signal $Y_i$ during a second duration, the first and the second time durations being separated in time;
determine relations between the receiver impairment $r_i$, the transmitter impairment $t_i$, of the first group of antennas, to the receiver impairment $r_j$, and the transmitter impairment $t_j$, of the second group of antennas, based on received signals $Y_i$, $Y_j$, mutually orthogonal signals $C_i$, $C_j$ and assumed OTA channel reciprocity; and
calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, the quota of the receiver impairment $r_i$, to the transmitter impairment $t_i$, being equal to at least one quota of the receiver impairment $r_j$, to the transmitter impairment $t_j$, providing reciprocity calibration of antennas in the first and second antenna groups in the D-MIMO system.

10. A distributed multiple input multiple output, D-MIMO, system configured to perform over-the-air, OTA, reciprocity calibration, the system comprising:
two separate antenna groups, each antenna pair of antennas of a first group of the two antennas groups is adapted to have a path loss that is either above a first path loss threshold, or below a second path loss threshold, the first path loss threshold being higher than the second path loss threshold, each antenna i having a receiver and a transmitter having a receiver impairment $r_i$ and a transmitter impairment $t_i$, respectively, each transmitter of the antennas i in the first antenna group is adapted to transmit a mutually orthogonal signal $C_i$ during a first duration, and each receiver of the antennas j in a second group of the two separate antenna groups is adapted to receive a signal $Y_j$ during the first duration, and each transmitter of the antennas j in the second antenna group is adapted to transmit a mutually orthogonal signal $C_j$ during a second duration, and each receiver of the antennas i in the first antenna group is adapted to receive a signal $I'_i$ during the second duration, the first and second durations being separated in time; and
a processing unit connectable to antennas i of the first antenna group, and to antennas j of the second antenna group, the processing unit being operative configured to:
initiate each transmitter of the antennas i in the first antenna group, to transmit the mutually orthogonal signal $C_i$ during the first duration;
initiate each receiver of the antennas j in the second antenna group to receive the signal $Y_j$ during the first duration;
initiate each transmitter of the antennas j in the second antenna group to transmit the mutually orthogonal signal $C_j$ during the second duration;
initiate each receiver of the antennas i in the first antenna group to receive a signal $Y_i$ during the second duration;
determine relations between the receiver impairment $r_i$, the transmitter impairment $t_i$, of the first antenna group, to the receiver impairment $r_j$, and the transmitter impairment $t_j$, of the second antenna group, based on received signals $Y_i$, $Y_j$, mutually orthogonal signals $C_i$, $C_j$ and assumed OTA channel reciprocity; and
calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, the quota of the receiver impairment $r_i$, to the transmitter impairment $t_i$, being equal to at least one quota of the receiver impairment $r_j$, to the transmitter impairment $t_j$, thereby providing reciprocity calibration of antennas in the first and second antenna groups in the D-MIMO system.

11. A processing unit configured to perform over-the-air, OTA, reciprocity calibration of a distributed multiple input-multiple output, D-MIMO, system, the system comprising two separate antenna groups, each antenna pair of antennas of a first group of the two antennas groups is adapted to have a path loss that is one of above a first path loss threshold and below a second path loss threshold, the first path loss threshold being higher than the second path loss threshold, each antenna having a receiver and a transmitter, having a receiver impairment $r_i$ and a transmitter impairment $t_i$, respectively, the processing unit being adapted to be connected to antennas i of the first antenna group, and to antennas j of the second antenna group, the processing unit comprising a processing circuitry and a memory, the memory containing instructions executable by the processing circuitry, the processing unit being configured to:

initiate each transmitter of the antennas i in the first antenna group, to transmit a mutually orthogonal signal $C_i$ during a first duration;

initiate each receiver of the antennas j in a second group of the two antenna groups, to receive a signal $Y_j$ during the first duration;

initiate each transmitter of the antennas j in the second antenna group, to transmit a mutually orthogonal signal $C_j$ during a second duration, the first and the second time durations being separated in time;

initiate each receiver of the antennas i in the first antenna group, to receive a signal $Y_i$ during the second duration;

determine relations between the receiver impairment $r_i$, the transmitter impairment $t_i$, of the first antenna group, to the receiver impairment $r_j$, and the transmitter impairment $t_j$, of the second antenna group, based on received signals $Y'_i$, $Y_j$, mutually orthogonal signals $C_i$, $C_j$, and assumed OTA channel reciprocity; and calibrate a quota of the receiver impairment $r_i$, to the transmitter impairment $t_i$, in relation to at least one quota of the receiver impairment $r_j$, to the transmitter impairment $t_j$, based on the determined relations for radio response reciprocity, the quota of the receiver impairment $r_i$, to the transmitter impairment $t_i$, being equal to at least one quota of the receiver impairment $r_j$, to the transmitter impairment $t_j$, thereby providing reciprocity calibration of antennas in the first and second antenna groups in the D-MIMO system.

12. The processing unit according to claim 11, further configured to initiate transmission of a calibration signal that is orthogonal to all other calibration signals to be transmitted from antennas within the same antenna group.

13. The processing unit according to claim 12, configured to simultaneously initiate transmission via each one of the antennas in the one of the first and second antenna group.

14. The processing unit according to claim 13, further configured to simultaneously initiate each one of the antennas in the one of the first and second antenna group to receive.

15. The processing unit according to claim 12, further configured to determine relations between a quota of the receiver impairment $r_i$, to the transmitter impairment $t_i$, of the first antenna group, and quotas of the receiver impairment $r_j$, to the transmitter impairment $t_j$, of the second antenna group, based on received signals $Y_i$, $Y_j$, mutually orthogonal signals $C_i$, $C_j$, and assumed OTA channel reciprocity.

16. The processing unit according to claim 11, configured to simultaneously initiate transmission via each one of the antennas in the one of the first and second antenna group.

17. The processing unit according to claim 16, further configured to simultaneously initiate each one of the antennas in the one of the first and second antenna group to receive.

18. The processing unit according to claim 11, further configured to determine relations between a quota of the receiver impairment $r_i$, to the transmitter impairment $t_i$, of the first antenna group, and quotas of the receiver impairment $r_j$, to the transmitter impairment $t_j$, of the second antenna group, based on received signals $Y_i$, $Y_j$, mutually orthogonal signals $C_i$, $C_j$, and assumed OTA channel reciprocity.

19. The processing unit according to claim 11, wherein the processing is configured to adjust one of the receiver impairment $r_i$, the transmitter impairment $t_i$, and both the receiver impairment $r_i$ and the transmitter impairment $t_i$, the determined relations for radio response reciprocity being fulfilled, thereby providing reciprocity calibration of antennas in the first and second antenna groups in the D-MIMO system.

20. The processing unit according to claim 11, comprising a beamforming processing unit located within a central node.

* * * * *